UNITED STATES PATENT OFFICE.

FERDINAND A. LOBERT, OF NATIONAL CITY, CALIFORNIA.

COMPOSITION OF MATTER.

No. 896,558.  Specification of Letters Patent.  Patented Aug. 18, 1908.

Application filed April 22, 1907. Serial No. 369,654.

*To all whom it may concern:*

Be it known that I, FERDINAND A. LOBERT, a citizen of the United States, residing at National City, in the county of San Diego and State of California, have invented certain new and useful Improvements in Compositions of Matter; and I do declare the following to be a full, clear, and exact description of the invention, such as will enable others skilled in the art to which it appertains to make and use the same.

This invention relates to a composition of matter designed particularly for the manufacture of pipes and the like whereby such articles are produced which are indestructible by excessive heat or cold and will be water proof.

The composition consists of the following ingredients combined in the proportions stated. For each pound of the material I employ, asphaltum, 2 ounces; sulfur, 1 ounce; marl, 12½ ounces; asbestos, ½ ounce.

The ingredients are combined, subjected to a gentle heat and thoroughly mixed, after which the material is placed in suitable molds in a plastic state and allowed to harden. Pipes, receptacles or containers, and the like, formed of this composition will not be affected by extreme heat or cold.

I claim—

1. The hereinbefore described composition of matter for pipes and the like which consists of asphaltum, 2 oz.; sulfur, 1 oz.; marl, 12½ oz.; and asbestos ½ oz.

2. The hereinbefore described composition of matter resulting from a mixture of natural rock asphaltum 2 oz.; sulfur 1 oz.; marl 12½ oz. and asbestos ½ oz., while being subjected to the heat of substantially 450° Fahrenheit.

3. The herein described composition of matter resulting from the mixture of oil rock asphaltum, sulfur, marl and asbestos while being subjected to the heat of substantially 450° Fahrenheit.

In testimony whereof I have hereunto set my hand in presence of two subscribing witnesses.

FERDINAND A. LOBERT.

Witnesses:
WILLIAM L. RAHR,
GRACE ANSELMÉ